US011982964B2

(12) United States Patent
Kogiso

(10) Patent No.: US 11,982,964 B2
(45) Date of Patent: May 14, 2024

(54) IMAGE FORMING APPARATUS AND IMAGE FORMING SYSTEM

(71) Applicant: TOSHIBA TEC KABUSHIKI KAISHA, Tokyo (JP)

(72) Inventor: Yoshiki Kogiso, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/947,198

(22) Filed: Sep. 19, 2022

(65) Prior Publication Data

US 2024/0094669 A1 Mar. 21, 2024

(51) Int. Cl.
*G03G 15/00* (2006.01)

(52) U.S. Cl.
CPC ....... *G03G 15/553* (2013.01); *G03G 15/5004* (2013.01); *G03G 15/5016* (2013.01); *G03G 15/5037* (2013.01)

(58) Field of Classification Search
CPC ........... G03G 15/5037; G03G 15/5016; G03G 15/5004; G03G 15/553
See application file for complete search history.

(56) References Cited

U.S. PATENT DOCUMENTS

2004/0213594 A1 10/2004 Takayanagi
2019/0227471 A1 7/2019 Hayashi et al.

FOREIGN PATENT DOCUMENTS

CN 101354556 A * 1/2009 ......... G03G 15/0266
JP 2010-26083 2/2010
JP 2018-77382 5/2018

OTHER PUBLICATIONS

CN_101354556_A_I, MachineTranslation, Kubo, 2009.*
JP_2010026083_A_I Machine Translation, Muto, Japan, 2010.*

* cited by examiner

*Primary Examiner* — Victor Verbitsky
(74) *Attorney, Agent, or Firm* — Amin, Turocy & Watson, LLP

(57) ABSTRACT

An image forming apparatus includes a photoreceptor, a charger, an exposure device, a developing device, a transfer device, a power supply, a detection element, and a processor. The processor sets a transfer bias used in image forming processing based on the resistance value calculated using the value of the transfer bias supplied by the power supply, a measured value measured by the detection element, and the potential of the photoreceptor estimated from the charging potential at which the charger charges the photoreceptor if the measured value is measured, and determines the state of the photoreceptor based on a change in the surface potential of the photoreceptor if the charger changes the charging potential for charging the photoreceptor.

18 Claims, 8 Drawing Sheets

IMAGE FORMING APPARATUS AND IMAGE FORMING SYSTEM

FIELD

Embodiments described herein relate generally to an image forming apparatus and an image forming system.

BACKGROUND

In the related art, some image forming apparatuses placed in workplaces determine the life of the photoreceptor drum based on the running time. However, the method of determining the life of the photoreceptor drum based on the running time has a problem that the deterioration of the photoreceptor may differ from what is expected depending on the usage conditions of the photoreceptor drum. In addition, the method of determining the life of the photoreceptor drum based on the running time has a problem that the deterioration of the photoreceptor drum may differ from what is expected due to oxidation of the film of the photoreceptor due to deterioration over time.

DETAILED DESCRIPTION

In general, according to one embodiment, the image forming apparatus includes a photoreceptor, a charger, an exposure device, a developing device, a transfer device, a power supply, a detection element, and a processor. The charger charges the photoreceptor. The exposure device forms an electrostatic latent image on the photoreceptor charged by the charger. The developing device supplies developer for developing the electrostatic latent image on the photoreceptor. The transfer device applies a transfer bias for transferring the developer image on the photoreceptor developed by the developing device to the transfer body. The power supply supplies a transfer bias to the transfer device.

The detection element measures an electrical characteristic value if the power supply supplies a transfer bias to the transfer device. The processor sets a transfer bias to be used for image forming processing based on the resistance value calculated using the value of the transfer bias supplied by the power supply, the measured value measured by the detection element, and the potential of the photoreceptor estimated from the charging potential at which the charger charges the photoreceptor if the measured value is measured, and determines the state of the photoreceptor based on the change in the surface potential of the photoreceptor if the charging potential at which the charger charges the photoreceptor was changed.

Next, the configuration of an image forming apparatus 1 according to the embodiment will be described.

Figure 1:
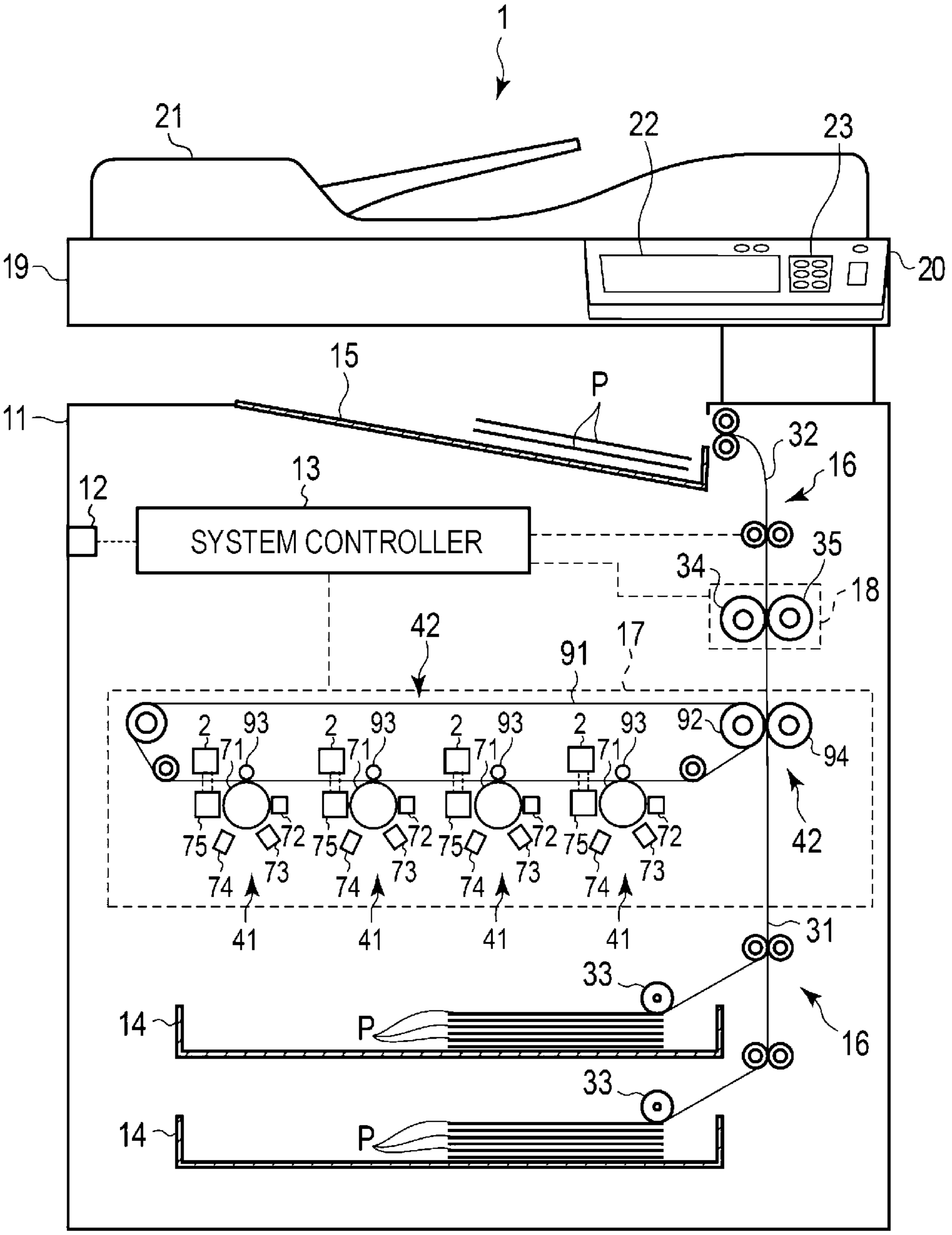
FIG. 1 is a schematic diagram showing a schematic configuration of an image forming apparatus according to an embodiment.

FIG. 1 is a schematic diagram showing a schematic configuration of the image forming apparatus 1 according to an embodiment.

The image forming apparatus 1 forms an image on a print medium P by an electrophotographic process. The image forming apparatus 1 forms an image developed with toner on the print medium P. The toner may be a single color toner or may be multiple color toners. FIG. 1 is a diagram showing a configuration example of the image forming apparatus 1 that performs image forming processing using four color toners of yellow, magenta, cyan, and black.

As shown in FIG. 1, the image forming apparatus 1 includes a housing 11, a communication interface 12, a controller 13, a plurality of paper trays 14, a paper discharge tray 15, a conveying mechanism 16, an image forming mechanism 17, a fixing device 18, a scanner 19, and a control panel 20.

The housing 11 is the main body of the image forming apparatus 1. The housing 11 accommodates, for example, the communication interface 12, the controller 13, the plurality of paper trays 14, the conveying mechanism 16, the image forming mechanism 17, the fixing device 18, and the like. A part of the upper surface of the housing 11 serves as the paper discharge tray 15.

The communication interface 12 is an interface for communicating with other devices connected through a network. The communication interface 12 is used for communication with external devices. The external device is, for example, a server computer as a management device. The communication interface 12 is composed of, for example, a LAN connector or the like. The communication interface 12 may perform wireless communication with other devices according to standards such as Bluetooth (registered trademark) or Wi-Fi (registered trademark).

The controller 13 controls each part of the image forming apparatus 1 and executes data processing and the like. For example, the controller 13 is a computer including a processor, a memory, and various interfaces. The controller 13 performs control of each part and data processing by the processor executing a program stored in the memory. The controller 13 is connected to each part inside the housing 11 through various internal interfaces. For example, the controller 13 is connected to the communication interface 12, the discharge tray 15, the conveying mechanism 16, the image forming mechanism 17, the fixing device 18, the scanner 19, and the like.

The controller 13 generates a print job based on data acquired from an external device via the communication interface 12. The print job includes image data representing an image to be formed on the print medium P. The image data may be data for forming an image on one print medium P, or data for forming images on a plurality of print media P. The print job may include information indicating whether it is to be printed in color or monochrome.

The controller 13 includes an engine controller that controls operations of the conveying mechanism 16, the image forming mechanism 17, and the fixing device 18. For example, the controller 13 controls conveyance of the print medium P by the conveying mechanism 16. The controller 13 controls formation of a developer image by the image forming mechanism 17 and transfer of the developer image to the print medium P. The controller 13 controls the fixing of the developer image onto the print medium P by the fixing device 18. The controller 13 forms an image of the image data included in the print job on the print medium P by controlling the operations of the conveying mechanism 16, the image forming mechanism 17, and the fixing device 18.

The image forming apparatus 1 may be configured to include an engine controller separately from the controller 13. For example, the image forming apparatus 1 may be provided with an engine controller for controlling at least one of the conveying mechanism 16, the image forming mechanism 17, the fixing device 18, and the like, separately from the controller 13. The engine controller, which is provided separately from the controller 13, may acquire information necessary for control from the controller 13.

The plurality of paper trays 14 are cassettes that accommodate print media P, respectively. The paper tray 14 is configured so that the print medium P can be supplied from the outside of the housing 11. For example, the paper tray 14 is configured to be able to be pulled out from the housing 11.

The conveying mechanism 16 is a mechanism that conveys the print medium P within the image forming apparatus 1. As shown in FIG. 1, the conveying mechanism 16 has a plurality of conveyance paths. The conveying mechanism 16 includes a paper feed conveyance path 31 and a paper discharge conveyance path 32.

The paper feed conveyance path 31 and the paper discharge conveyance path 32 are composed of a plurality of rollers, a plurality of guides, and the like. The plurality of rollers convey the print medium P by rotating with power transmitted from the drive mechanism. The plurality of guides control the conveyance direction of the print medium P conveyed by the rollers.

The paper feed conveyance path 31 picks up the print medium P from the paper tray 14 and supplies the picked-up print medium P to the image forming mechanism 17. The paper feed conveyance path 31 includes a plurality of pickup rollers 33 corresponding to each paper tray 14. Each pickup roller 33 picks up the print medium P from the paper tray 14 into the paper feed conveyance path 31.

The paper discharge conveyance path 32 is a conveyance path for discharging the print medium P on which an image was formed by the image forming mechanism 17 from the housing 11. The paper discharge conveyance path 32 discharges the print medium P to the paper discharge tray 15. The paper discharge tray 15 is a tray for receiving the print medium P discharged from the image forming apparatus 1.

The image forming mechanism 17 has a configuration for forming an image on the print medium P. Details of the image forming mechanism 17 will be described later.

The fixing device 18 includes a heat roller 34 and a pressure roller 35. The fixing device 18 heats the print medium P conveyed on the paper discharge conveyance path 32 to a predetermined temperature by the heat roller 34. The fixing device 18 further presses the print medium P heated by the heat roller 34 with the pressure roller 35. The fixing device 18 fixes the image (developer image) on the print medium P to the print medium P by heating and pressurizing the print medium P.

The scanner 19 is a device that reads a document and converts the read document into image data. The scanner 19 is installed on top of the housing 11. The scanner 19 includes an automatic document feeder 21. The scanner 19 reads the image of the document conveyed by the automatic document feeder 21.

The control panel 20 includes a touch panel 22, a keyboard 23, and the like. The touch panel 22 is, for example, a laminate of a display such as a liquid crystal display or an organic EL display, and a touch sensor that detects touch input. A display including the touch panel 22 is a display device of the image forming apparatus 1.

The keyboard 23 includes various keys for the user of the image forming apparatus 1 to operate. For example, the keyboard 23 includes numeric keys, a power key, a paper feed key, function keys, and the like. Each key may be referred to as a button. The touch panel 22 and keyboard 23 are input devices of the image forming apparatus 1.

Next, the image forming mechanism 17 will be described.

The image forming mechanism 17 includes a plurality of image forming stations 41 and a transfer mechanism 42, as shown in FIG. 1. Each image forming station 41 forms a toner image. Each image forming station 41 is provided for each type of toner. In the example shown in FIG. 1, each image forming station 41 corresponds to each color toner such as yellow, magenta, cyan, and black from the left side. Each image forming station 41 is provided with a toner cartridge 2 having a corresponding color toner. FIG. 1 illustrates the image forming apparatus 1 having four image forming stations 41 corresponding to four color toners of yellow, magenta, cyan, and black.

Next, the image forming station 41 will be described.

Each image forming station 41 includes a photoreceptor drum (photoreceptor) 71, a cleaner 72, a charger 73, an exposure device 74, a developing device 75, and a primary transfer roller (transfer device).

The photoreceptor drum 71 includes a cylindrical drum and a photoreceptor layer formed on the outer peripheral surface of the drum. The photoreceptor drum 71 is a photoreceptor. The outer peripheral surface of the photoreceptor drum 71 is an image carrier. The photoreceptor drum 71 rotates at a constant speed by power transmitted from the drive mechanism.

The cleaner 72 includes a blade that contacts the surface of the photoreceptor drum 71. The cleaner 72 removes toner remaining on the surface of the photoreceptor drum 71 using the blade.

The charger 73 uniformly charges the surface of the photoreceptor drum 71. The charger 73 is also called a charging charger. The charger 73 is, for example, of a scorotron system. The charger 73 applies a grid bias voltage (charging potential) output from the grid electrode to the photoreceptor drum 71 to uniformly charge the photoreceptor drum 71 to a negative potential (surface potential). The surface potential of the photoreceptor drum 71 charged by the charger 73 changes depending on the number of times it is driven and the elapsed time. Generally, in an image forming apparatus using a scorotron charger, the surface potential of the photoreceptor drum 71 attenuates with the life of the photoreceptor drum 71.

The exposure device 74 includes a plurality of light emitting elements. The light emitting element is, for example, a laser diode (LD), a light emitting diode (LED), an organic EL (OLED), or the like. The plurality of light emitting elements are arranged in the main scanning direction parallel to the rotary axis of the photoreceptor drum 71. Each light emitting element is configured to emit light to one point on the photoreceptor drum 71.

The exposure unit 74 forms an electrostatic latent image for one line on the photoreceptor drum 71 by irradiating the surface of the charged photoreceptor drum 71 with light from the plurality of light emitting elements arranged in the main scanning direction. Further, the exposure device 74 continuously irradiates the rotating photoreceptor drum 71 with light to form a plurality of lines of electrostatic latent images.

The developing device 75 is a device that causes toner to adhere to the photoreceptor drum 71. The developing device 75 accommodates developer containing toner and carrier. The developing device 75 agitates the toner and carrier supplied from the toner cartridge 2 with an agitating mechanism. The developing device 75 supplies toner to the photoreceptor drum 71 from a developing roller to which developer containing toner and carrier agitated by the agitating mechanism adheres. The developing device 75 develops the electrostatic latent image on the photoreceptor drum 71 with toner by supplying toner to the photoreceptor drum 71. The photoreceptor drum 71 holds a toner image (developer image) developed with toner by the developing device 75. The photoreceptor drum 71 rotates to send the toner image to a transfer position on a transfer belt 91.

The transfer mechanism 42 transfers the toner image formed on the surface of the photoreceptor drum 71 onto the print medium P. In the configuration example shown in FIG. 1, the transfer mechanism 42 includes the transfer belt (transfer body) 91, a drive roller 92, a plurality of primary transfer rollers (transfer devices) 93, and a secondary transfer roller 94.

The transfer belt 91 is a medium (transfer body) onto which the toner image formed on the surface of the photoreceptor drum 71 of each image forming station 41 is transferred. The transfer belt 91 is an intermediate transfer body that holds an image to be transferred onto the print medium P. As shown in the configuration example shown in FIG. 1, the transfer belt 91 is an endless belt wound around the drive roller 92 and a plurality of winding rollers. The back surface of the transfer belt 91, which is the inner surface, contacts the drive roller 92 and the plurality of winding rollers. The transfer belt 91 faces the photoreceptor drum 71 of each image forming station 41 on the outer surface thereof.

The drive roller 92 is rotated by power transmitted from the drive mechanism. The drive roller 92 conveys the transfer belt 91 by rotating. In the configuration example shown in FIG. 1, the drive roller 92 rotates counterclockwise. The transfer belt 91, which is an endless belt, is conveyed to rotate counterclockwise by the rotation of the drive roller 92. The plurality of winding rollers are configured to be freely rotatable. The plurality of winding rollers rotate as the transfer belt 91 is moved by the drive roller 92.

A plurality of primary transfer rollers (transfer devices) 93 are provided for each image forming station 41. Each primary transfer roller 93 is provided to face the photoreceptor drum 71 of the corresponding image forming station 41. Each primary transfer roller 93 is provided at a position facing the photoreceptor drum 71 of the corresponding image forming station 41 with the transfer belt 91 interposed therebetween. A position where the primary transfer roller 93 faces the photoreceptor drum 71 with the transfer belt 91 interposed therebetween is referred to as a primary transfer portion. The image (toner image) on the photoreceptor drum 71 is transferred to the transfer belt 91 in the primary transfer portion.

The primary transfer roller 93 contacts the inner peripheral surface of the transfer belt 91. The primary transfer roller 93 presses the transfer belt 91 toward the photoreceptor drum 71 from the inner peripheral surface side. The surface (peripheral surface) of the transfer belt 91 pressed by the primary transfer roller 93 contacts the photoreceptor drum 71. When transferring an image (toner image) from the photoreceptor drum 71, the primary transfer roller 93 applies a transfer bias to the photoreceptor drum 71 via the transfer belt 91. The toner image from the photoreceptor drum 71 is transferred onto the transfer belt 91 by the transfer bias applied from the primary transfer roller 93.

The secondary transfer roller 94 is provided at a position facing the drive roller 92. The secondary transfer roller 94 contacts the surface of the transfer belt 91 whose inner peripheral surface is conveyed by the drive roller 92. The secondary transfer roller 94 presses the transfer belt 91 toward the drive roller 92 side. The surface of the transfer belt 91 sandwiched between the drive roller 92 and the secondary transfer roller 94 is in close contact with the secondary transfer roller 94. A transfer nip is formed where the surface of the transfer belt 91 and the secondary transfer roller 94 are in close contact.

The secondary transfer roller 94 conveys the print medium P supplied by the paper feed conveyance path 31 while sandwiching the print medium P between itself and the transfer belt 91. The print medium P passes through the transfer nip. The secondary transfer roller 94 presses the print medium P passing through the transfer nip against the surface of the transfer belt 91. The secondary transfer roller 94 applies a transfer bias to the transfer belt 91 via the print medium P when transferring the toner image on the transfer belt 91 to the print medium P at the transfer nip. The toner image on the transfer belt 91 is transferred to the print medium P by the transfer bias.

The transfer mechanism 42 transfers (primary transfer) the toner image on the photoreceptor drum 71 to the transfer belt 91 in contact with the photoreceptor drum 71 by a transfer bias applied from the primary transfer roller 93 in the primary transfer portion. If a plurality of image forming stations 41 are provided, the transfer mechanism 42 primarily transfers toner images from the photoreceptor drums 71 of the plurality of image forming stations 41 to the transfer belt 91.

The transfer mechanism 42 sends the toner image primarily transferred onto the surface of the transfer belt 91 to the transfer nip (secondary transfer portion). The transfer mechanism 42 transfers the toner image transferred onto the surface of the transfer belt 91 onto the print medium P present in the transfer nip by a transfer bias applied from the secondary transfer roller 94. The transfer belt 91 is an example of an image carrier that holds a toner image to be transferred onto the print medium P.

Next, the configuration of the control system in the image forming apparatus 1 will be described.

Figure 2:
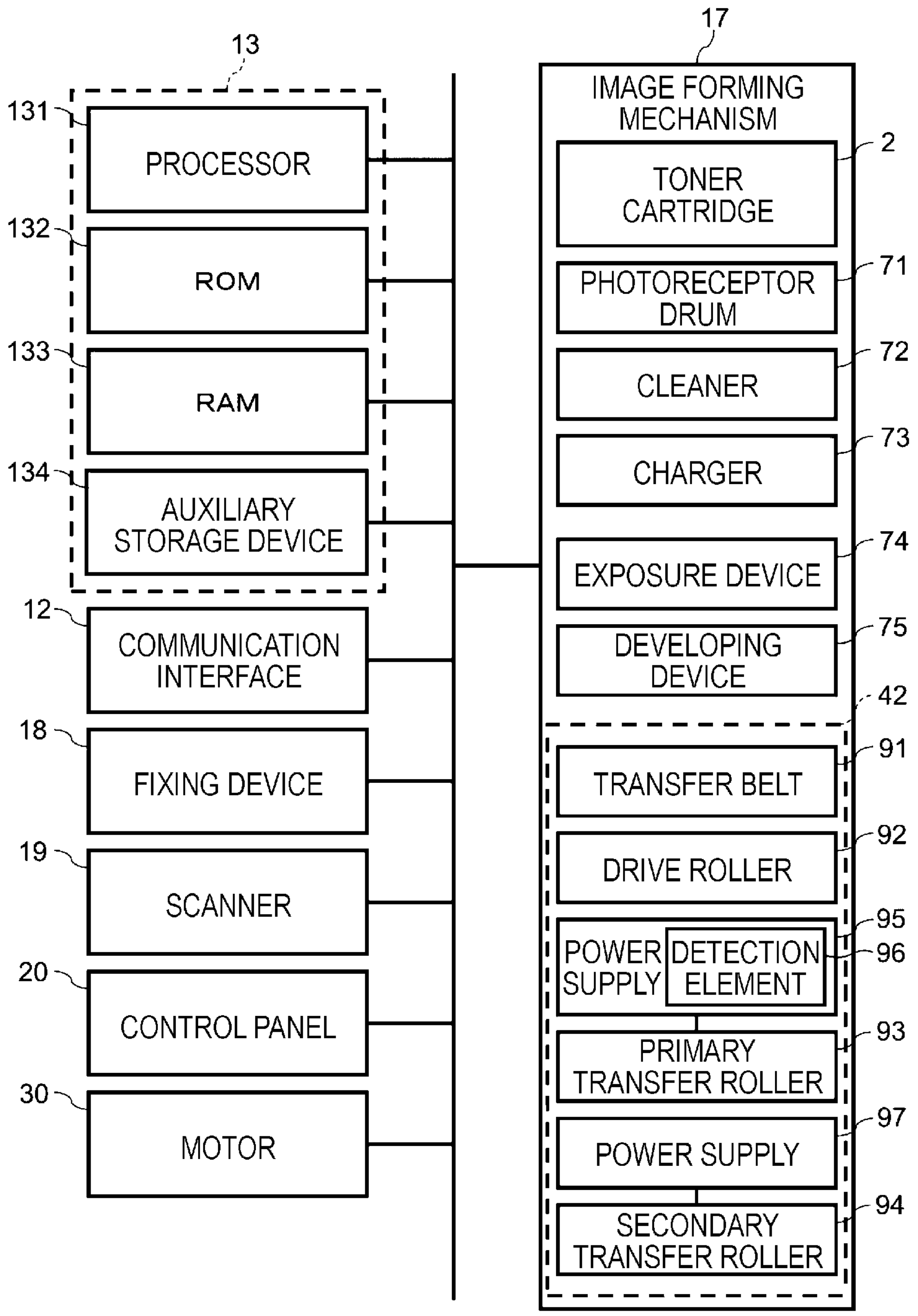
FIG. 2 is a block diagram showing a configuration example of a control system of the image forming apparatus.

FIG. 2 is a block diagram showing a configuration example of a control system in the image forming apparatus 1.

As shown in FIG. 2, the image forming apparatus 1 connects the controller 13 with the communication interface (first communication interface) 12, the image forming mechanism 17, the fixing device 18, the scanner 19, the control panel 20, the motor 30, and the like.

The controller 13 includes a processor 131, a ROM (Read Only Memory) 132, a RAM (Random Access Memory) 133, and an auxiliary storage device 134. The controller 13 forms a computer with the processor 131, the ROM 132, the RAM 133, and the auxiliary storage device 134.

The processor (first processor) 131 corresponds to the central part of the computer as the controller 13. The processor 131 controls each part of the image forming apparatus 1 according to an operating system or application program. The processor 131 is, for example, a CPU (Central Processing Unit).

The ROM 132 and the RAM 133 correspond to the main memory portion of the computer as the controller 13. The ROM 132 is a non-volatile memory area, and the RAM 133 is a volatile memory area. The ROM 132 stores an operating system or application programs. The ROM 132 stores control data necessary for the processor 131 to execute processing for controlling each part. The RAM 133 is used as a work area in which data is appropriately rewritten by the processor 131. The RAM 133 has a work area for storing image data, for example.

The auxiliary storage device 134 corresponds to the auxiliary storage portion of the computer as the controller 13. The auxiliary storage device 134 is configured by a storage device such as an EEPROM (Electric Erasable Programmable Read-Only Memory), an HDD (Hard Disc Drive), or an SSD (Solid State Drive). The auxiliary storage device 134 stores data such as setting data used if the processor 131 performs various processes. The auxiliary storage device 134 stores data generated by processing executed by the processor 131. The auxiliary storage device 134 may store application programs.

The controller 13 is connected to the toner cartridge 2, the photoreceptor drum 71, the cleaner 72, the charger 73, the exposure device 74, and the developing device 75 in each image forming station 41. The controller 13 controls the toner cartridge 2, the photoreceptor drum 71, the cleaner 72, the charger 73, the exposure device 74, and the developing device 75. For example, the controller 13 controls ON and OFF of charging of the charger 73 of each image forming station 41. The controller 13 controls ON and OFF of the laser beam that is radiated to the photoreceptor drum with respect to the exposure unit 74 of each image forming station 41. Further, the controller 13 controls ON and OFF of the developing bias for the developing device 75 of each image forming station 41.

The controller 13 is connected to the transfer mechanism 42. The transfer mechanism 42 includes the transfer belt 91, the drive roller 92, the plurality of primary transfer rollers 93, the secondary transfer roller 94, the power supply 95, and the power supply 97. The plurality of primary transfer rollers 93 are primary transfer rollers provided in each image forming station 41.

The power supply 95 supplies a transfer bias (primary transfer bias) that the primary transfer roller 93 applies to the photoreceptor drum 71 faced across the transfer belt 91. The power supply 95 may be a current source or a voltage source. The power supply 95 includes a detection element 96. If the power supply 95 is a current source, the detection element 96 is a voltage detection element. Also, if the power supply 95 is a voltage source, the detection element 96 is assumed to be a current detection element.

The power supply 95 and the detection element 96 are connected to the controller 13. The controller 13 controls ON and OFF of the transfer bias applied by the primary transfer roller 93 from the power supply 95. The controller 13 controls the transfer bias value (applied value) applied by the primary transfer roller 93 from the power supply 95. The controller 13 acquires the value detected by the detection element 96. If the detection element 96 is a voltage detection element, the controller 13 acquires the voltage value (potential) detected by the detection element 96. If the detection element 96 is a current detection element, the controller 13 acquires the current value detected by the detection element 96.

The power supply 97 supplies a transfer bias (secondary transfer bias) that the secondary transfer roller 94 applies to the opposing roller 92. The power supply 97 is connected to the controller 13. The controller 13 controls ON and OFF of the transfer bias applied by the secondary transfer roller 94 from the power supply 97. The controller 13 controls the transfer bias value (applied value) applied by the secondary transfer roller 94 from the power supply 97. The controller 13 determines the value of the transfer bias according to the basis weight (or thickness) of the print medium, the type of print medium, and the like.

The motor 30 is a motor that operates each part. The motor 30 is connected to the controller 13. The motor 30 is driven according to control from the controller 13. The motor 30 includes, for example, a first motor, a second motor, and a third motor. The first motor as the motor 30 drives the conveying mechanism 16. The second motor as the motor 30 rotates the photoreceptor drum 71. The third motor as the motor 30 rotates the drive roller 92. A plurality of second motors are provided corresponding to the photoreceptor drums 71 respectively provided in the plurality of image forming stations 41. The motor 30 may include motors other than the first, second and third motors.

Next, the resistance value for determining the primary transfer bias in each image forming station 41 of the image forming apparatus 1 according to the embodiment will be described.

The image forming apparatus 1 according to the embodiment determines the primary transfer bias based on the combined load (resistance value) R of the transfer belt 91 and the primary transfer roller 93. The primary transfer bias is a positive bias applied to the primary transfer roller 93 to transfer the developer image from the photoreceptor drum 71 to the transfer belt 91. The processor 131 of the controller 13 determines the value (set value) of the primary transfer bias so as not to generate noise images such as discharge marks. The processor 131 of the image forming apparatus according to the present embodiment determines the primary transfer bias by calculating the resistance value R, which is the combined load of the transfer belt 91 and the primary transfer roller 93. The image forming apparatus 1 according to the embodiment has a function of calculating the resistance value R between the transfer belt 91 and the primary transfer roller 93 and a function of performing transfer settings such as the primary transfer bias based on the resistance value R.

Next, the process of calculating the combined load (resistance value) R of the transfer belt 91 and the primary transfer roller 93 (hereinafter referred to as a resistance detection process) will be described.

Here, it is assumed that the power supply 95 is a current source and the detection element 96 is a voltage detection element. The processor 131 acquires the current value supplied to the primary transfer roller 93 by the power supply 95 and the voltage value (potential) detected by the detection element 96 as the voltage detection element. The processor 131 calculates the resistance value R between the transfer belt 91 and the primary transfer roller 93 based on the current value supplied by the power supply 95 and the voltage value detected by the detection element 96.

Figure 3:
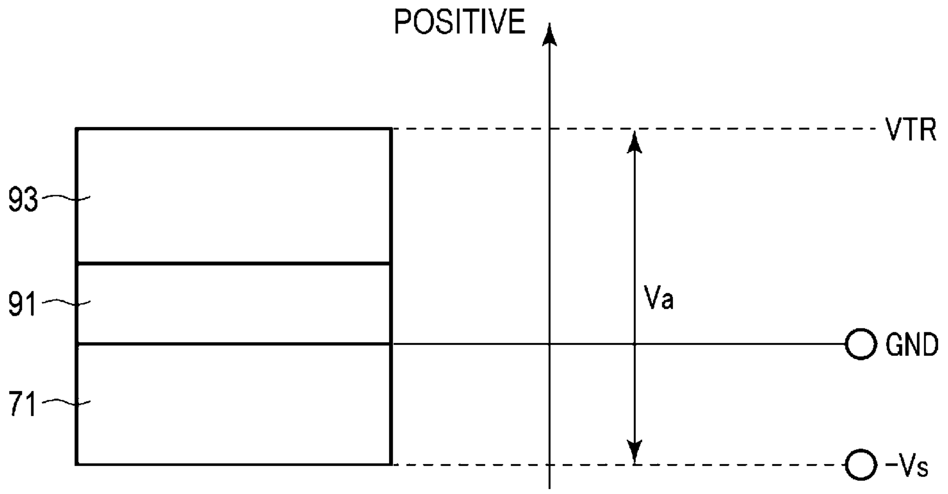
FIG. 3 is a diagram for illustrating combined loads of a primary transfer roller and a transfer belt in each image forming station of the image forming apparatus.

FIG. 3 is a diagram for illustrating the potential difference Va between the primary transfer roller 93 and the photoreceptor drum 71 in each image forming station 41 of the image forming apparatus 1 according to the embodiment.

In FIG. 3, the potential VTR is the result of measurement by the detection element 96, which is a voltage detection element. The potential VTR is a positive potential detected by the detection element 96, which is a voltage detection element, with the ground (GND) as a reference. Further, in FIG. 3, the potential −Vs is the surface potential of the photoreceptor drum 71. The surface potential −Vs of the photoreceptor drum 71 is a negative potential with the ground (GND) as a reference.

The combined load (resistance value) R of the primary transfer roller 93 and the transfer belt 91 is calculated using the voltage Va shown in FIG. 3. The voltage Va is the potential difference between the measurement result VTR by the voltage detecting element 96 and the surface potential −Vs of the photoreceptor drum 71, as shown in FIG. 3. Therefore, the voltage Va is calculated by the following Equation (1) from the measurement result VTR by the voltage detection element 96 and the surface potential −Vs of the photoreceptor drum 71.

$$Va=VTR-(-Vs) \quad (1)$$

It is assumed that ITR is the current value supplied from the current source 95 to the primary transfer roller 93 as a transfer bias if the voltage detection element 96 detects a voltage. The resistance value R between the primary transfer roller 93 and the transfer belt 91 is calculated by the following Equation (2) using the current value ITR and the voltage Va.

$$R=Va/ITR \quad (2)$$

However, if the primary transfer bias is not bipolar, in order to obtain the resistance value R, it is necessary to set the current value ITR and the resistance value R so as to satisfy at least the following Equation (3).

$$R \cdot ITR \geq |Vs| \quad (3)$$

If Equation (3) is not satisfied, the current value will be determined by Vs, and ITR will flow a current that exceeds the target current. Therefore, if Equation (3) is not satisfied, the resistance value R becomes inconvenient.

The processor 131 acquires the measurement result VTR by the voltage detection element 96, the current value ITR at the time of voltage detection, and the surface potential −Vs of the photoreceptor drum 71 in the resistance detection process. If the processor 131 acquires the measurement result VTR, the surface potential −Vs, and the current ITR, the resistance value R is calculated using Equations (1) and (2). The processor 131 determines a transfer current as a primary transfer bias that each image forming station 41 uses for primary transfer (image forming processing) based on the resistance value R calculated by the resistance detection process.

In the example described above, the power supply 95 is a current source that supplies a current having a current value set by a constant current power supply. If the power supply 95 is a current source, the detection element 96 used in the resistance detection process is a voltage detection element. In this case, the processor 131 executes the transfer setting such that the transfer current set based on the resistance value R is the transfer bias used in the image forming processing.

The detection element 96 used for the resistance detection process may be a current detection element instead of a voltage detection element. If the detection element 96 used for the resistance detection process is a current detection element, the power supply 95 is a voltage source that supplies a voltage having a voltage value set by a constant voltage power supply. If the power supply 95 is a voltage source and the detection element 96 is a current detection element, the processor 131 acquires the current value measured by the detection element 96 and the transfer voltage supplied by the power supply 95. The processor 131 calculates the voltage Vaa from the current value, which is the measured value of the detection element 96, and the surface potential Vsia. The processor 131 calculates the resistance value R from the transfer voltage supplied by the power supply 95 as the transfer bias and the voltage Vaa if the detection element 96 measures the measured value. In this case, the processor 131 executes the transfer setting with the transfer voltage set based on the resistance value R as the transfer bias used in the image forming processing.

Next, the surface potential of the photoreceptor drum 71 in each image forming station 41 of the image forming apparatus 1 according to the embodiment will be described.

The surface potential of the photoreceptor drum 71 changes depending on various factors such as the number of times it is driven. For example, if the charger 73 is of the scorotron system, the surface potential of the photoreceptor drum 71 attenuates with the life of the photoreceptor drum 71. The processor 131 has a function of determining the surface potential of the photoreceptor drum 71 by the resistance detection process because the surface potential of the photoreceptor drum 71 changes due to various factors. In the resistance detection process, the processor 131 estimates the surface potential of the photoreceptor drum 71 based on preset parameters. The image forming apparatus 1 may include a sensor for measuring the surface potential of the photoreceptor drum 71 in the transfer settings.

In the following description, the surface potential of the photoreceptor drum 71 is Vs, and the charging potential by the charger 73 is Vg. The surface potential Vs and the charging potential Vg are potentials of the negative electrode. For the surface potential Vs and the charging potential Vg, if the numerical value increases in the negative direction is expressed as high or large. In addition, if the numerical value of the measurement result VTR by the detection element 96 increases in the positive direction, it is expressed as high or large.

Figure 4:
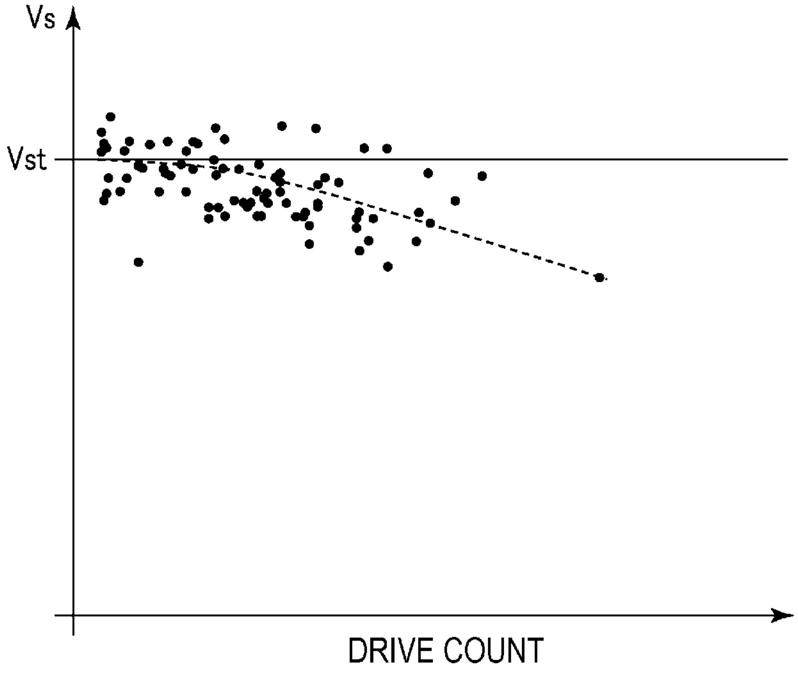
FIG. 4 is a diagram illustrating an example of change in the surface potential of a photoreceptor drum with respect to a first charging potential of the image forming apparatus.
Figure 5:
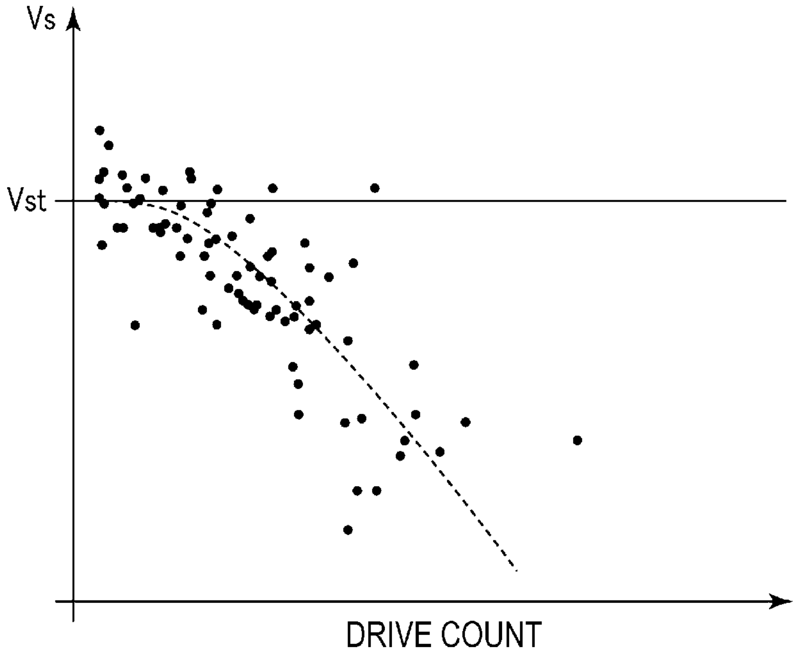
FIG. 5 is a diagram showing an example of change in the surface potential of the photoreceptor drum with respect to a second charging potential higher than the first charging potential of the image forming apparatus.

FIGS. 4 and 5 are diagrams showing examples of the relationship between the drive count of the photoreceptor drum 71 and the surface potential of the photoreceptor drum 71 in the image forming apparatus 1 according to the embodiment.

FIG. 4 is a diagram showing an example of measuring the surface potential Vs of the photoreceptor drum 71 if the charging potential Vg is set to a first charging potential (for example, 300 V). FIG. 5 is a diagram showing an example of measuring the surface potential Vs of the photoreceptor drum 71 if the charging potential Vg is set to a second charging potential (for example, 900 V) higher than the first charging potential.

In the examples shown in FIGS. 4 and 5, the surface potential Vs of the photoreceptor drum 71 tends to attenuate according to the drive count of the photoreceptor drum 71. Further, the surface potential Vs of the photoreceptor drum 71 changes according to the magnitude of the charging potential Vg. In the examples shown in FIGS. 4 and 5, the target potential of the surface potential Vs of the photoreceptor drum 71 is Vst. As shown in FIGS. 4 and 5, the surface potential Vs of the photoreceptor drum 71 deviates from the target potential Vst (potential difference) as the charging potential Vg increases.

The dotted line shown in FIG. 4 is a parameter (estimation line) indicating the value (estimated value) of the surface potential Vs estimated with respect to the drive count if the charging potential Vg is the first charging potential (300 V). The dotted line shown in FIG. 5 is a parameter (estimation line) indicating the value (estimated value) of the surface potential Vs estimated with respect to the drive count if the charging potential Vg is the second charging potential (900 V).

The surface potential Vs of the photoreceptor drum 71 varies around the estimation line, as shown in FIGS. 4 and 5. This is because the surface potential Vs of the photoreceptor drum 71 tends to change due to factors other than the drive count, such as elapsed time.

The auxiliary storage device 134 or the ROM 132 stores parameters indicating the estimated value of the surface potential for drive counts for various charging potentials. The processor 131 calculates the surface potential of the photoreceptor drum 71 based on the parameters for each charging potential (surface potential based on an estimated value). For example, if the charging potential Vg is 300 V, the processor 131 estimates the surface potential of the photoreceptor drum 71 according to the drive count based on the parameter indicated by the dotted line in FIG. 4. Also, if the charging potential Vg is 900 V, the processor 131 estimates the surface potential of the photoreceptor drum 71 according to the drive count based on the parameter indicated by the dotted line in FIG. 5. In the following description, the surface potential of the photoreceptor drum 71 estimated based on parameters (surface potential based on an estimated value) is denoted as Vsi.

Next, an operation mode for estimating the life of the photoreceptor drum 71 in the image forming apparatus 1 according to the embodiment (hereinafter referred to as a life estimation mode) will be described.

The processor 131 of the controller 13 executes a life estimation mode for estimating the life of the photoreceptor drum 71 by executing the resistance detection process for calculating the resistance value R described above. The surface potential Vs of the photoreceptor drum 71 has a characteristic that as the charging potential Vg by the charger 73 increases, the deviation (potential difference) from the target potential Vst increases. The processor 131 estimates the life of the photoreceptor drum 71 by obtaining changes in the surface potential of the photoreceptor drum 71 if the charging potential Vg is changed to a plurality of values.

The processor 131 executes life estimation process for estimating the life of the photoreceptor drum 71 in the life estimation mode at a preset timing. For example, the processor 131 may execute the life estimation process if the image forming apparatus 1 is started. Further, the processor 131 may execute the life estimation process if the number of times of image formation reaches a set number, or may execute the life estimation process each time a set period elapses.

Next, an operation example of the life estimation process for estimating the life of the photoreceptor drum 71 by the image forming apparatus 1 according to the embodiment will be described.

Figure 7:
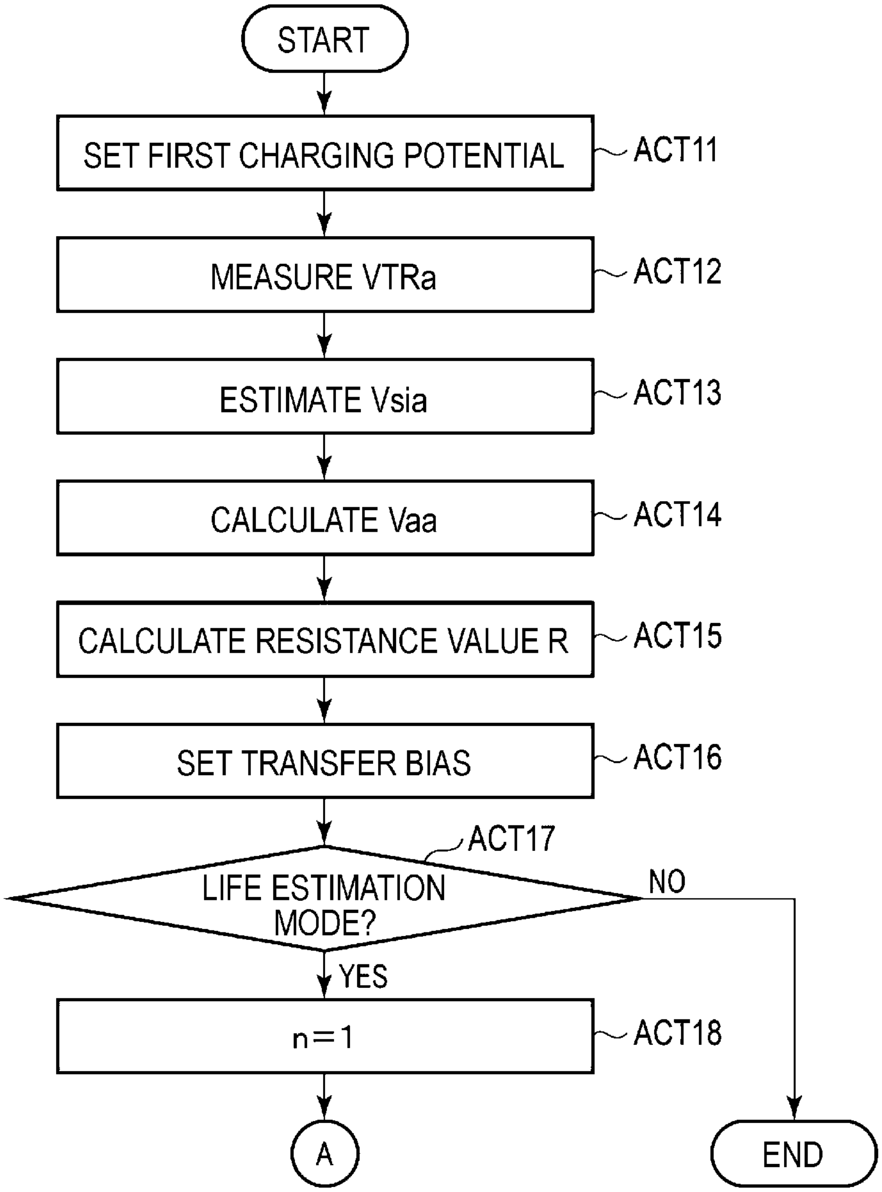
FIG. 7 is a flowchart for illustrating an example of a life estimation process of the photoreceptor drum of the image forming apparatus.
Figure 8:
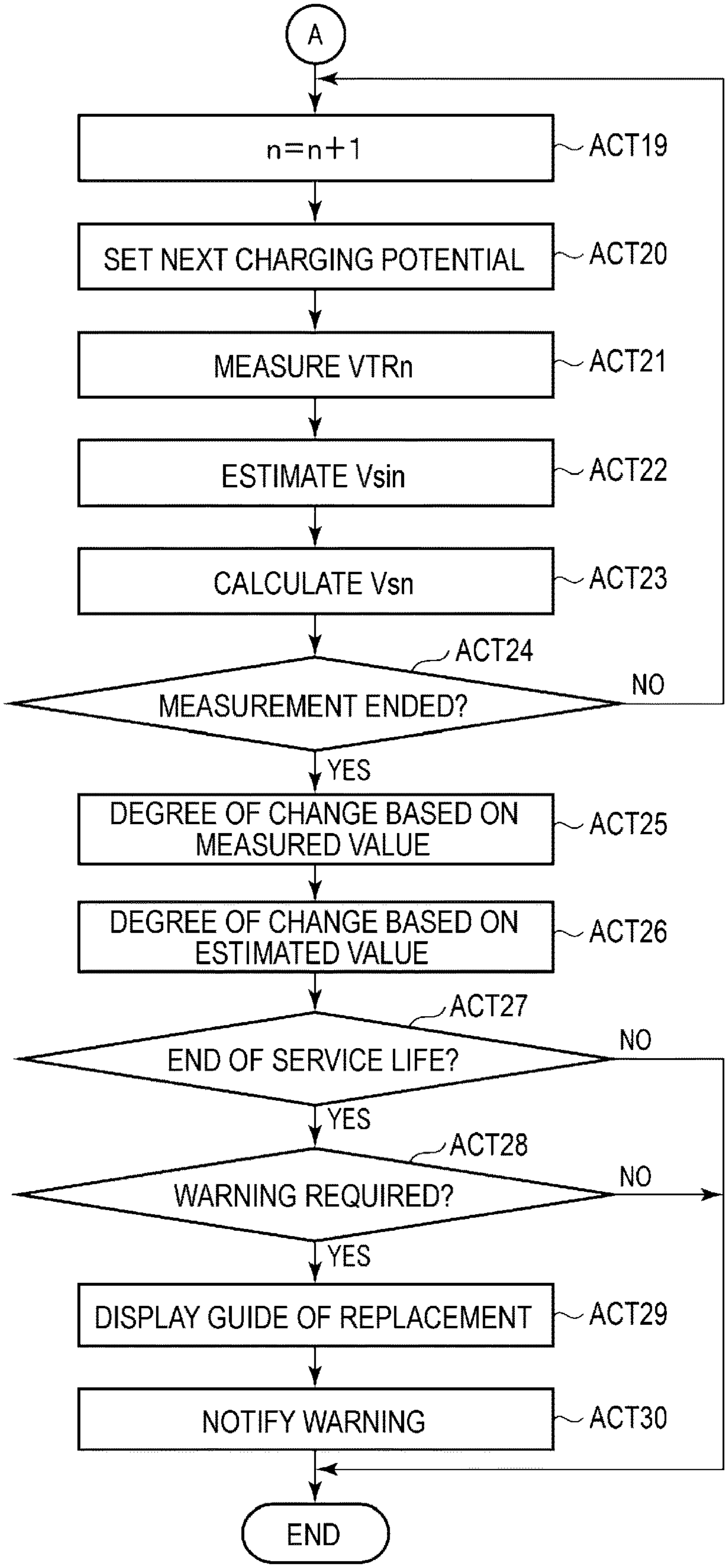
FIG. 8 is a flowchart for illustrating an example of the life estimation process of the photoreceptor drum of the image forming apparatus.

FIGS. 7 and 8 are flowcharts for illustrating an operation example of the life estimation process for estimating the life of the photoreceptor drum 71 by the image forming apparatus 1 according to the embodiment.

FIGS. 7 and 8 describe an operation example in which the life estimation process is executed following the transfer setting process based on the resistance value R calculated by the resistance detection process.

First, the processor 131 of the image forming apparatus 1 sets the first charging potential Vga for setting the transfer bias (ACT 11). The charger 73 charges the photoreceptor drum 71 with the first charging potential Vga instructed by the processor 131. The first charging potential Vga is a charging potential for setting the transfer bias (transfer current) that the power supply 95 supplies to the primary transfer roller 93. If the power supply 95 is a current source, the processor 131 executes the transfer setting process for setting a transfer current as a transfer bias to be supplied to the primary transfer roller 93.

After setting the first charging potential Vga, the processor 131 drives the photoreceptor drum 71 without forming an electrostatic latent image and executes the resistance detection process. The processor 131 supplies a predetermined transfer current ITR to the primary transfer roller 93 from the power supply 95 and acquires the voltage VTRa as the measurement result (measured value) detected by the detection element 96 (ACT 12).

After acquiring the voltage VTRa, the processor 131 estimates the surface potential Vsia of the photoreceptor drum 71 based on the parameter (estimation line) corresponding to the charging potential Vga (ACT 13). After acquiring the voltage VTRa and the surface potential Vsia, the processor 131 calculates the voltage Vaa by Equation (1) (ACT 14). After calculating the voltage Vaa, the processor 131 uses the transfer current ITR supplied by the power supply 95 to calculate the resistance value R by Equation (2) (ACT 15). After calculating the resistance value R, the processor 131 sets a transfer bias (transfer current) used for image forming processing based on the resistance value R (ACT 16).

If the power supply 95 is a voltage source and the detection element 96 is a current detection element, the processor 131 acquires the current value that is the measured value of the detection element 96 and the transfer voltage supplied by the power supply 95. The processor 131 calculates the voltage Vaa from the current value, which is the measured value of the detection element 96, and the surface potential Vsia. The processor 131 calculates the resistance value R from the transfer voltage supplied by the power supply 95 and the voltage Vaa.

After setting the transfer bias, the processor 131 determines whether or not to estimate the life (or degree of deterioration) of the photoreceptor drum 71 in the life estimation mode (ACT 17). For example, the processor 131 determines whether or not to execute the life estimation process based on whether or not it is a preset timing. In addition, the processor 131 may execute the life estimation process according to an operator's instruction on the control panel 20. Also, the processor 131 may execute the life estimation process in accordance with an instruction from an external device connected via the communication interface 12.

If it is determined not to execute the life estimation mode (ACT 18, NO), the processor 131 ends the series of processes. If the processor 131 determines to execute the life estimation mode (ACT 18, YES), the operation mode is set to the life estimation mode. If the operation mode is set to the life estimation mode, the processor 131 sets the variable n to n=1 (ACT 18) and further sets n=n+1 (ACT 19).

After updating the variable n to n=n+1, the processor 131 sets the n-th charging potential (Vgn) as the next charging potential (ACT 20). In this embodiment, n=2, 3, . . . are expressed as b, c, . . . For example, if n=2, the second charging potential is expressed as Vgb.

If the n-th charging potential Vgn is set, the processor 131 acquires the voltage VTRn as the measurement result detected by the detection element 96 through resistance detection process (n-th resistance detection process) (ACT 21). If n=2, the processor 131 acquires the voltage VTRb as the measurement result detected by the detection element 96 with the charging potential set to Vgb.

After acquiring the voltage VTRn, the processor 131 estimates the surface potential Vsin of the photoreceptor drum 71 based on the parameter (estimation line) corresponding to the charging potential Vgn (ACT 22). The processor 131 calculates the surface potential Vsb of the photoreceptor drum 71 based on the measurement result of the detection element 96 by subtracting Vaa from the voltage VTRn (ACT 23). For example, if n=2, the processor 131 calculates the surface potential Vsib and the surface potential Vsb.

After calculating the surface potential Vsin and the surface potential Vsn, the processor 131 determines whether or not to end the measurement of the surface potential of the photoreceptor drum 71 (ACT 24). The processor 131 may determine to end the measurement of the surface potential for estimating the life of the photoreceptor drum 71 if the variable n reaches a predetermined number of times (the number of measurements).

For example, if the number of measurements is set to 3, the processor 131 advances to ACT 19 if n=2, and executes the resistance detection process with n=3 and the charging potential Vgc. The processor 131 acquires the voltage VTRc, the surface potential Vsic, and the surface potential Vsc by the resistance detection process with the charging potential Vgc. The processor 131 ends the measurement of the surface potential of the photoreceptor drum 71 if n=3 (the number of measurements). The processor 131 acquires VTRb, Vsib, and Vsb if the charging potential is Vgb, and VTRc, Vsic, and Vsc if the charging potential is Vgc.

If it is determined to end the measurement (ACT 24, YES), the processor 131 calculates the degree of change Sa of the surface potential Vsn calculated from the measured value by the detection element 96 in the resistance detection process (ACT 25). The processor 131 uses the surface potential Vsia and the surface potential Vsn (Vsb, Vsc, . . . ) to calculate the function Fa representing the degree of change Sa of the surface potential with respect to the charging potential. If the number of measurements is 3, the processor 131 calculates the function Fa by using the surface potentials Vsia, Vsb, and Vsc with respect to the charging potentials Vga, Vgb and Vgc. For example, the degree of change Sa is the slope of the function Fa, which is a linear function as shown in FIG. 6.

In addition, the processor 131 calculates the degree of change Sb of the surface potential Vsin, which is an estimated value estimated using parameters through the resistance detection process (ACT 26). The processor 131 uses the surface potential Vsia and the surface potential Vsin (Vsib, Vsic, . . . ) to calculate the function representing the degree of change Sb of the surface potential with respect to the change of the charging potential. If the number of measurements is 3, the processor 131 calculates the function Fb by using the surface potentials Vsia, Vsib, and Vsic, which are estimated values for the charging potentials Vga, Vgb, and Vgc. For example, the degree of change Sb is the slope of the function Fb, which is a linear function as shown in FIG. 6.

Figure 6:
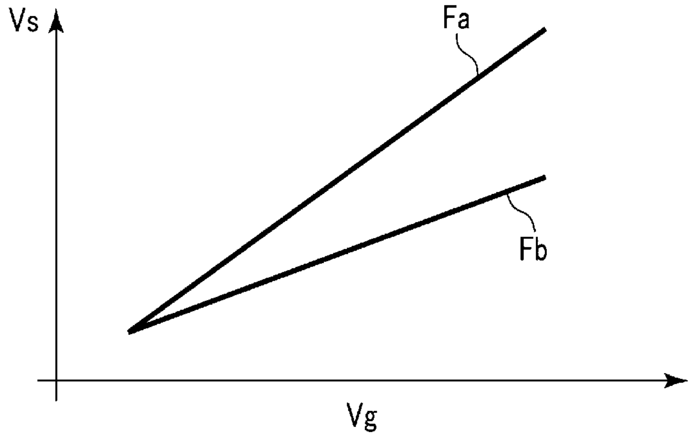
FIG. 6 is a graph showing the relationship between the charging potential and the surface potential of the photoreceptor drum of the image forming apparatus.

FIG. 6 is a diagram showing an example of generating a function Fa representing changes in surface potential based on measured values and a function Fb representing changes in surface potential based on estimated values as linear functions.

In FIG. 6, the horizontal axis is the charging potential, and the vertical axis is the surface potential of the photoreceptor drum 71. The function Fa is a linear function that indicates the change in the surface potential Vsn based on the measured value with respect to the change in charging potential. The slope of the function Fa corresponds to the degree of change Sa of the surface potential of the photoreceptor drum 71 based on the measured value of the detection element. The function Fb is a linear function that indicates the change in the surface potential based on the estimated value with respect to the change in charging potential. The slope of the function Fb corresponds to the degree of change Sb of the surface potential of the photoreceptor drum 71 estimated using parameters.

In the example shown in FIG. 6, the slope of the function Fa (degree of change Sa) is greater than the slope of the function Fb (degree of change Sb). The difference between the slope of the function Fa and the slope of the function Fb indicates the difference between the surface potential measured by the detection element 96 and the surface potential estimated using a predetermined parameter. As shown in FIGS. 4 and 5, the predetermined parameter (estimated value) is a value that predefines the decrease in surface potential according to the drive count of the photoreceptor drum 71 or the like.

For example, the processor 131 determines whether the slope of the function Fa is greater than the slope of the function Fb by a predetermined threshold or more. If the value obtained by subtracting the slope of function Fb from the slope of function Fa is less than a predetermined threshold value, the processor 131 determines that the decrease in surface potential of the photoreceptor drum 71 is within an expected range. If the slope of function Fa is greater than the slope of function Fb by a predetermined threshold or more, the processor 131 determines that the decrease in surface potential of the photoreceptor drum 71 exceeds an expected range.

If the decrease in the surface potential of the photoreceptor drum 71 is within the expected range, the image forming apparatus 1 can maintain the image transfer performance because the transfer setting is performed using the parameters. If the decrease in the surface potential of the photoreceptor drum 71 exceeds the expected range, it becomes difficult for the image forming apparatus 1 to maintain the image transfer performance. Therefore, if the decrease in the surface potential of the photoreceptor drum exceeds the expected range, the image forming apparatus 1 determines that the photoreceptor drum 71 reached the end of its service life (replacement is required).

The processor 131 determines whether or not the photoreceptor drum 71 reached the end of its service life based on the difference between the degree of change Sa of the surface potential measured by the detection element 96 and the degree of change Sb of the surface potential determined by the estimated value (ACT 26). Here, the processor 131 determines whether or not the photoreceptor drum 71 reached the end of its service life based on whether or not the degree of change Sa is greater than the degree of change Sb by a predetermined threshold or more. The processor 131 may determine the degree of deterioration of the photoreceptor drum 71 according to the difference between the degree of change Sa and the degree of change Sb.

If the processor 131 determines that the photoreceptor drum 71 did not reach the end of its service life (ACT 27, NO), the processor 131 terminates the life estimation mode.

If the processor 131 determines that the photoreceptor drum 71 reached the end of its service life (ACT 27, YES), the processor 131 determines whether to issue a warning such as replacement of the photoreceptor drum 71 (ACT 28). For example, if the number of times the determination that the processor 131 determines that the photoreceptor drum 71 reached the end of its service life exceeds a predetermined number of times, the processor 131 issues a warning prompting replacement of the photoreceptor drum 71. Further, the processor 131 may issue a warning if the degree of deterioration of the photoreceptor drum 71 based on the difference between the degree of change Sa and the degree of change Sb exceeds a predetermined value.

If the processor 131 determines not to issue a warning (ACT 28, NO), the processor 131 stores the fact that the processor 131 determined that the photoreceptor drum 71 reached the end of its service life in the auxiliary storage device 134, and terminates the life estimation mode.

If the processor 131 determines to issue a warning (ACT 28, YES), the processor 131 displays a guide prompting replacement of the photoreceptor drum 71 on the display device of the control panel 20 (ACT 29). If the processor 131 determines to issue a warning (ACT 28, YES), the processor 131 transmits a signal prompting replacement of the photoreceptor drum 71 to the administrator (serviceman) through the communication interface 12 (ACT 30). Here, if the processor 131 determines to issue a warning, the processor 131 may also transmit information indicating the number of times the determination that the photoreceptor drum 71 reached the end of its service life and the degree of deterioration of the photoreceptor drum 71 to the administrator.

The processor 131 executes the life estimation process on the photoreceptor drum 71 in each image forming station 41 of the image forming apparatus 1. For example, if the life estimation process for one photoreceptor drum ends, the processor 131 executes the life estimation process for another photoreceptor drum 71. In the case of an image forming apparatus having image forming stations for four colors, the processor 131 performs the life estimation process on the photoreceptor drum 71 of each image forming station.

As described above, the image forming apparatus according to the embodiment executes the resistance detection process for calculating the resistance value, which is the combined load of the primary transfer roller 93 and the transfer belt, in the transfer settings. The image forming apparatus calculates the resistance value using the value of the transfer bias supplied by the power supply, the measured value measured by the detection element, and the surface potential of the photoreceptor estimated from the charging potential if the measured value is measured. The image forming apparatus executes transfer setting including setting of transfer bias used for image forming processing based on the resistance value calculated by the resistance detection process. The image forming apparatus determines the state (life or degree of deterioration) of the photoreceptor based on changes in the surface potential of the photoreceptor calculated by resistance detection process if the charging potential is changed to a plurality of values.

Thereby, the image forming apparatus according to the embodiment can measure the surface potential of the photoreceptor by the resistance detection process without installing a surface potential sensor on the surface of the photoreceptor. As a result, the image forming apparatus according to the embodiment can detect the life and deterioration of the photoreceptor based on the change in the surface potential of the photoreceptor if the charging potential is changed.

Next, a modification of the above-described embodiment will be described.

The life estimation process for estimating the life of the photoreceptor drum as described above can also be performed by an image forming system including the image forming apparatus 1 and a server communicating with the image forming apparatus 1. As a modification of the above-described embodiment, an image forming system including the image forming apparatus 1 having the above-described configuration and a server communicating with the image forming apparatus 1 will be described.

Figure 9:
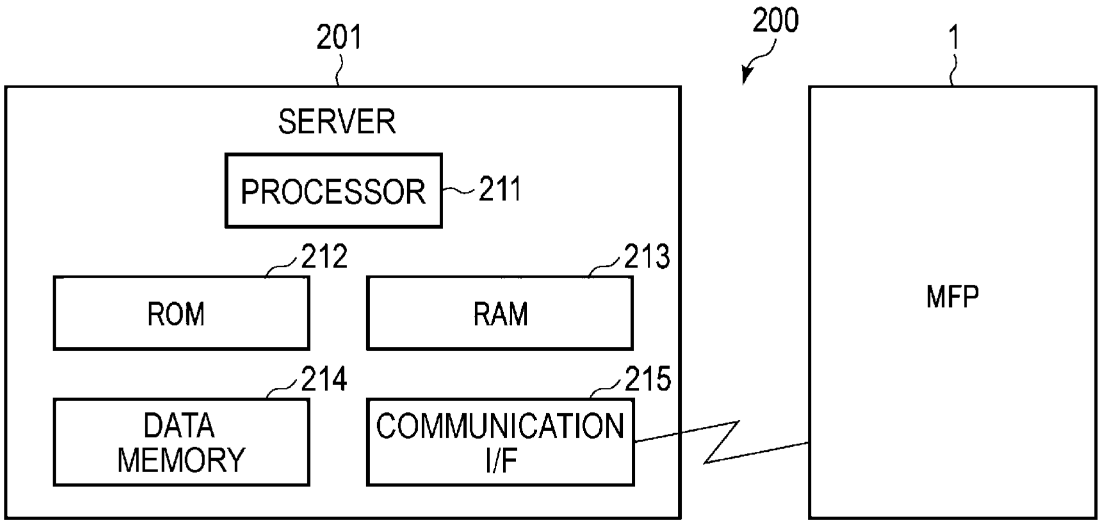
FIG. 9 is a block diagram showing a configuration example of an image forming system included in the image forming apparatus.

FIG. 9 is a block diagram showing a configuration example of an image forming system 200 according to a modification of the embodiment.

In the image forming system 200, the image forming apparatus 1 and a server 201 are communicably connected. In the configuration example shown in FIG. 9, it is assumed that the image forming apparatus 1 has the configuration shown in FIGS. 1 and 2. In the image forming system 200, the image forming apparatus 1 supplies the server 201 with data used for transfer setting including the resistance detection process, and the life estimation process. The server 201 uses various data acquired from the image forming apparatus 1 to perform transfer setting including the resistance detection process and the life estimation process.

In the configuration example shown in FIG. 9, the server 201 includes a processor 211, a ROM (Read Only Memory) 212, a RAM (Random Access Memory) 213, a data memory 214, and a communication interface 215.

The processor 211 corresponds to the central part of the computer as the server 201. The processor 211 is, for example, a CPU (Central Processing Unit). The processor 211 executes various processes by executing programs. For example, the processor 211 executes an operating system or application programs.

The ROM 212 and the RAM 213 correspond to the main memory portion of the computer as the server 201. The ROM 212 is a non-volatile memory area. The RAM 212 is a volatile memory area. The ROM 212 stores, for example, an operating system or application programs. The ROM 212 stores control data necessary for the processor 211 to execute processing for controlling each part. The RAM 213 is used as a work area in which data is appropriately rewritten by the processor 211. The RAM 213 has a work area for storing image data, for example.

The data memory 214 corresponds to the auxiliary storage portion of the computer as the server 201. The data memory 214 is composed of a storage device such as an EEPROM (Electric Erasable Programmable Read-Only Memory), an HDD (Hard Disc Drive), or an SSD (Solid State Drive). The data memory 214 stores data such as setting data used if the processor 211 performs various processes. The data memory 214 stores data generated by processing executed by the processor 211. The data memory 214 may store application programs.

The communication interface 215 is an interface for communicating with other devices connected through a network. The communication interface 215 is used for communication with the image forming apparatus 1. The communication interface 215 is, for example, an interface for LAN communication. Also, the communication interface 12 may be an interface that performs wireless communication with other devices according to standards such as Bluetooth or Wi-Fi.

Next, the operation of the image forming system 200 according to the modification of the embodiment will be described.

In the image forming system 200, the server 201 acquires various information from the image forming apparatus 1. The server 201 executes operation setting of the image forming apparatus 1 by processing the information acquired from the image forming apparatus 1. Further, the server 201 monitors (determines) the state of the image forming apparatus 1 by processing the information acquired from the image forming apparatus 1.

In the image forming system 200 according to the modification of the embodiment, the server 201 executes the processing described with reference to FIGS. 7 and 8 based on the information acquired from the image forming apparatus 1. That is, the server 201 executes the life estimation process for estimating the life or the degree of deterioration of the photoreceptor drum 71 in the image forming apparatus 1 by executing the above-described process.

The server 201 acquires the charging potential, the transfer bias value, and the measured value of the detection element 96 from the image forming apparatus 1 that operates without forming an electrostatic latent image on the photoreceptor drum 71. Further, the server 201 acquires the charging potential, the transfer bias value, and the measured value of the detection element 96 each time the charging potential is changed to a plurality of values. For example, the server 201 acquires Vga, the measurement result VTRa of the detection element 96, and the transfer current ITR from the image forming apparatus 1 having the first charging potential Vga as the charging potential. Further, the server 201 acquires Vgn and the measurement result VTRn of the detection element 96 from the image forming apparatus 1 having the charging potential as the n-th charging potential Vgn.

The processor 211 of the server 201 executes the processes shown in FIGS. 7 and 8 according to the information acquired from the image forming apparatus. An operation example of the server 201 will be described below with reference to FIGS. 7 and 8.

The processor 211 of the server 201 executes transfer setting including the resistance detection process of the image forming apparatus 1 communicating via the communication interface 215. The processor 211 acquires the first charging potential Vga, the transfer current ITR, and the voltage VTRa from the image forming apparatus 1 via the communication interface 215 (ACT 11, 12).

The processor 211 of the server 201 estimates the surface potential Vsia of the photoreceptor drum 71 from the parameter (estimation line) corresponding to the charging potential Vga (ACT 13). The processor 211 calculates the voltage Vaa according to above Equation (1) (ACT 14). The processor 211 calculates the resistance value R by Equation (2) (ACT 15). The processor 211 sets a transfer bias (transfer current) used for image forming processing based on the resistance value R (ACT 16).

Also in the image forming system 200 according to the modification, the transfer processing of ACT 11 to 16 may be executed by the processor 131 of the image forming apparatus 1. If the image forming apparatus 1 executes the processing of ACT 11 to ACT 16, the processor 211 of the server 201 acquires values such as Vga, Vsia, and Vaa from the image forming apparatus 1.

If the processor 211 of the server 201 executes the life estimation process in the life estimation mode (ACT 18, YES), the operation mode is set to the life estimation mode. If the operation mode is set to the life estimation mode, the processor 211 sets the variable n to an initial value (n=1) (ACT 18) and further sets n=n+1 (ACT 19).

If the variable n is updated to n=n+1, the processor 211 of the server 201 requests the image forming apparatus 1 to perform the n-th measurement. The processor 211 acquires the n-th charging potential Vgn and the voltage VTRn detected by the detection element 96 as a result of the n-th measurement from the image forming apparatus 1 (ACT 21). After acquiring the n-th charging potential Vgn, the processor 211 determines the surface potential Vsin of the photoreceptor drum 71 using the parameter (estimation line) corresponding to the charging potential Vgn (ACT 22). The processor 211 calculates the surface potential Vsb of the photoreceptor drum 71 based on the measured value of the detection element 96 by subtracting the voltage Vaa from the measurement result (measured value) VTRn of the detection element 96 (ACT 23).

If the variable n exceeds a predetermined number of times (number of measurements) (ACT 24, YES), the processor 211 calculates the degree of change Sa of the surface potential Vsn calculated from the measured value by the detection element 96 (ACT 25). The processor 211 also calculates the degree of change Sb of the surface potential Vsin, which is an estimated value estimated using the parameter corresponding to the charging potential Vgn (ACT 26).

The processor 211 determines whether or not the photoreceptor drum 71 reached the end of its service life (or the degree of deterioration of the photoreceptor drum 71) based on the difference between the degree of change Sa of the surface potential based on the measured value of the detection element 96 and the degree of change Sb of the surface potential based on the estimated value (ACT 26). The processor 211 determines the life or the degree of deterioration of the photoreceptor drum 71 as in the example described above. For example, the processor 211 determines that the photoreceptor drum 71 reached the end of its service life if the degree of change Sa is greater than or equal to the threshold value of the degree of change Sb.

If the processor 211 determines that the photoreceptor drum 71 reached the end of its life (ACT 27, YES), the processor 211 determines whether to issue a warning such as replacement of the photoreceptor drum 71 (ACT 28). If it is determined not to issue a warning (ACT 28, NO), the processor 211 stores in the data memory 214 the fact that the processor 211 determined that the photoreceptor drum 71 reached the end of its service life, and terminates the life estimation mode.

If it is determined to issue a warning (ACT 28, YES), the processor 211 causes the display device of the control panel 20 of the image forming apparatus 1 to display a guide prompting replacement of the photoreceptor drum 71 (ACT 29). Further, if the processor 211 determines to issue a warning (ACT 28, YES), the processor 211 transmits a signal prompting replacement of the photoreceptor drum 71 to the designated administrator (serviceman) (ACT 30).

As described above, the image forming system according to the modification of the embodiment includes an image forming apparatus and a server. The image forming apparatus notifies the server of the value of the transfer bias supplied by the power supply, the measured value measured by the detection element, and the charging potential if the measured value is measured. The server calculates the resistance value using the measured value of the detection element, the value of the transfer bias if the measured value is measured, and the surface potential of the photoreceptor estimated from the charging potential if the measured value is measured. Based on the calculated resistance value, the server executes transfer setting including transfer bias setting used in image forming processing by the image forming apparatus. Furthermore, the image forming apparatus changes the charging potential to a plurality of values, obtains measured values by the detection elements, and supplies the measured values of the detection elements and the charging potentials if the measured values are measured to the server. The server determines the state of the photoreceptor (life or degree of deterioration) based on changes in the surface potential of the photoreceptor calculated from the charging potentials having a plurality of values obtained from the image forming apparatus and the measured values of the detection elements at these charging potentials.

Thus, in the image forming system according to the modification of the embodiment, the server can calculate the surface potential of the photoreceptor without installing a surface potential sensor on the surface of the photoreceptor of the image forming apparatus. As a result, in the image forming system according to the modification of the embodiment, the server can detect the life and deterioration of the photoreceptor based on the change in the surface potential of the photoreceptor if the charging potential is changed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:

a photoreceptor;

a charger that charges the photoreceptor;

an exposure device that forms an electrostatic latent image on the photoreceptor;

a developing device that provides developer for developing the electrostatic latent image on the photoreceptor into a developer image;

a transfer device that applies a transfer bias to transfer the developer image from the photoreceptor developed to a transfer body;

a power supply that supplies the transfer bias to the transfer device;

a detection element that measures an electrical characteristic value when the power supply supplies the transfer bias to the transfer device; and a processor that sets the transfer bias to be used in image forming processing based on a resistance value calculated using a value of the transfer bias supplied by the power supply, a measured value measured by the detection element, and a potential of the photoreceptor estimated from a charging potential at which the charger charges the photoreceptor when the measured value is measured, and determines a state of the photoreceptor based on a change in a surface potential of the photoreceptor if the charger changes the charging potential for charging the photoreceptor, wherein the processor determines a degree of deterioration of the photoreceptor based on a difference between the change in the surface potential of the photoreceptor calculated using the measured values measured by the detection element if the charging potential is changed to a plurality of values, and the change in the surface potential of the photoreceptor estimated according to the plurality of values of the charging potential.

2. The image forming apparatus according to claim 1, wherein the power supply is a current source that supplies a transfer current as the transfer bias, the detection element is a voltage detection element that measures the potential of the transfer device, and the processor calculates a resistance value from the transfer current, the potential of the photoreceptor member, and the potential measured by the detection element.

3. The image forming apparatus according to claim 1, wherein the power supply is a voltage source that supplies a transfer voltage as the transfer bias, the detection element is a current detection element that measures a current value of the current that flows due to the transfer voltage, and the processor calculates a resistance value from the transfer voltage, the potential of the photoreceptor, and the current value measured by the detection element.

4. The image forming apparatus according to claim 1, wherein the processor determines the degree of deterioration of the photoreceptor based on a difference between a slope of a linear function indicating a change in the surface potential of the photoreceptor calculated using the measured values measured by the detection element, and a slope of a linear function indicating a change in the surface potential of the photoreceptor estimated according to a plurality of values of the charging potential.

5. The image forming apparatus according to claim 1, wherein the processor determines that the photoreceptor reaches the end of service life if the degree of change in the surface potential of the photoreceptor calculated using the measured values measured by the detection element is greater than the degree of change in the surface potential of the photoreceptor estimated in correspondence with the plurality of values of the charging potential by a predetermined threshold value or more.

6. The image forming apparatus according to claim 5, further comprising:

a display device, wherein the processor displays a guide prompting replacement of the photoreceptor on the display device if it is determined that the photoreceptor reaches the end of service life.

7. The image forming apparatus according to claim 5, further comprising:

a communication interface that communicates with external devices, wherein if it is determined that the photoreceptor reaches the end of service life, the processor transmits information to an administrator indicating that the photoreceptor is determined to reach the end of service life through the communication interface.

8. An image forming system comprising an image forming apparatus and a server, wherein the image forming apparatus includes a photoreceptor, a charger that charges the photoreceptor;

an exposure device that forms an electrostatic latent image on the photoreceptor;

a developing device that supplies developer for developing the electrostatic latent image on the photoreceptor into a developer image;

a transfer device that applies a transfer bias to transfer the developer image from the photoreceptor developed to a transfer body, a power supply that supplies the transfer bias to the transfer device;

a detection element that measures an electrical characteristic value when the power supply supplies the transfer bias to the transfer device;

a communication interface that communicates with the server; and a processor that transmits a value of the transfer bias supplied by the power supply, a measured value measured by the detection element, and a charging potential at which the charger charges the photoreceptor when the measured value is measured to the server via the communication interface, wherein the server includes a second communication interface that communicates with the image forming apparatus; and a second processor that sets the transfer bias used in image forming processing by the image forming apparatus based on a resistance value calculated from the value of the transfer bias obtained from the image forming apparatus, the measured value measured by the detection element, and a surface potential of the photoreceptor estimated from the charging potential at which the charger charges the photoreceptor if the measured value is measured, and determines a state of the photoreceptor based on the change in the surface potential of the photoreceptor if the charging potential at which the charger charges the photoreceptor is changed.

9. The image forming system according to claim 8, wherein the second processor of the server determines a degree of deterioration of the photoreceptor based on a difference between a change in the surface potential of the photoreceptor using the measured values measured by the detection element if the charging potential is changed to a plurality of values, and a change in the surface potential of the photoreceptor estimated corresponding to the plurality of values of the charging potential.

10. The image forming system according to claim 9, wherein the second processor determines the degree of deterioration of the photoreceptor based on a difference between a slope of a linear function indicating a change in the surface potential of the photoreceptor calculated using the measured values measured by the detection element, and a slope of a linear function indicating a change in the surface potential of the photoreceptor estimated according to a plurality of values of the charging potential.

11. The image forming system according to claim 9, wherein the second processor determines that the photoreceptor reaches the end of service life if the degree of change in the surface potential of the photoreceptor calculated using the measured values measured by the detection element is greater than the degree of change in the surface potential of the photoreceptor estimated in correspondence with the plurality of values of the charging potential by a predetermined threshold value or more.

12. A method for an image forming apparatus, comprising:

charging a photoreceptor with a charger;

forming an electrostatic latent image on the photoreceptor with an exposure device;

developing the electrostatic latent image on the photoreceptor into a developer image with developer;

transferring the developer image from the photoreceptor to a transfer body by applying a transfer bias from a transfer device supplied by a power supply;

measuring, by a detection element, an electrical characteristic value when the power supply supplies the transfer bias to the transfer device;

setting the transfer bias to be used in image forming processing based on a resistance value calculated using a value of the transfer bias supplied by the power supply, a measured value measured by the detection element, and a potential of the photoreceptor estimated from a charging potential at which the charger charges the photoreceptor when the measured value is measured, and determining a state of the photoreceptor based on a change in a surface potential of the photoreceptor if the charger changes the charging potential for charging the photoreceptor; and determining a degree of deterioration of the photoreceptor based on a difference between the change in the surface potential of the photoreceptor calculated using the measured values measured by the detection element if the charging potential is changed to a plurality of values, and the change in the surface potential of the photoreceptor estimated according to the plurality of values of the charging potential.

13. The method according to claim 12, wherein the power supply is a current source that supplies a transfer current as the transfer bias, the detection element is a voltage detection element that measures the potential of the transfer device, and the processor calculates a resistance value from the transfer current, the potential of the photoreceptor member, and the potential measured by the detection element.

14. The method according to claim 12, wherein the power supply is a voltage source that supplies a transfer voltage as the transfer bias, the detection element is a current detection element that measures a current value of the current that flows due to the transfer voltage, and the processor calculates a resistance value from the transfer voltage, the potential of the photoreceptor, and the current value measured by the detection element.

15. The method according to claim 12, further comprising:

determining the degree of deterioration of the photoreceptor based on a difference between a slope of a linear function indicating a change in the surface potential of the photoreceptor calculated using the measured values measured by the detection element, and a slope of a linear function indicating a change in the surface potential of the photoreceptor estimated according to a plurality of values of the charging potential.

16. The method according to claim 12, further comprising:

determining that the photoreceptor reaches the end of service life if the degree of change in the surface potential of the photoreceptor calculated using the measured values measured by the detection element is greater than the degree of change in the surface potential of the photoreceptor estimated in correspondence with the plurality of values of the charging potential by a predetermined threshold value or more.

17. The method according to claim 16, further comprising:

displaying a guide prompting replacement of the photoreceptor on a display device if it is determined that the photoreceptor reaches the end of service life.

18. The method according to claim 16, further comprising:

communicating with external devices; and if it is determined that the photoreceptor reaches the end of service life, transmitting information to an administrator indicating that the photoreceptor is determined to reach the end of service life.

* * * * *